(12) United States Patent
Reschke (10) Patent No.: US 11,897,644 B2
(45) Date of Patent: Feb. 13, 2024

(54) DOSING APPARATUS

(71) Applicant: MASA GmbH, Andernach (DE)

(72) Inventor: Frank Reschke, Melsbach (DE)

(73) Assignee: MASA GmbH, Andernach (DE)

( * ) Notice: Subject to any disclaimer, the term of this patent is extended or adjusted under 35 U.S.C. 154(b) by 902 days.

(21) Appl. No.: 16/504,058

(22) Filed: Jul. 5, 2019

(65) Prior Publication Data

US 2020/0010227 A1 Jan. 9, 2020

(30) Foreign Application Priority Data

Jul. 5, 2018 (DE) ..................... 10 2018 116 302.9

(51) Int. Cl.
| | |
|---|---|
| *B28B 13/02* | (2006.01) |
| *B65B 37/20* | (2006.01) |
| *G01F 13/00* | (2006.01) |
| *G01G 11/08* | (2006.01) |

(52) U.S. Cl.
CPC ............ *B65B 37/20* (2013.01); *B28B 13/022* (2013.01); *B28B 13/023* (2013.01); *B28B 13/0215* (2013.01); *B28B 13/0225* (2013.01); *G01F 13/001* (2013.01); *G01G 11/08* (2013.01)

(58) Field of Classification Search
None
See application file for complete search history.

(56) References Cited

U.S. PATENT DOCUMENTS

| | | | | |
|---|---|---|---|---|
| 9,833,955 | B2 * | 12/2017 | Muller | ...................... B22C 9/10 |
| 2008/0079185 | A1 * | 4/2008 | Jamrussamee | ........ B28B 13/026 |
| | | | | 264/86 |
| 2008/0190513 | A1 * | 8/2008 | Luechinger | ........... G01F 13/001 |
| | | | | 141/75 |

FOREIGN PATENT DOCUMENTS

EP 1187709 B1 * 4/2004 ............. B28B 1/008

\* cited by examiner

*Primary Examiner* — Jacob T Minskey
*Assistant Examiner* — Caroline Beha
(74) *Attorney, Agent, or Firm* — Lowe Graham Jones PLLC (57) ABSTRACT

The invention relates to a dosing apparatus for dosing bulk material into block forming elements, and for arrangement on a filling car of a filling apparatus of a block-making machine for manufacturing patterned blocks, in particular paving blocks. The filling car may be pushed forward and backward over block forming elements in a displacement direction, and a first bulk material component may be filled into the block forming elements with this car. The dosing apparatus comprises at least one filling box that has a lower outlet that may be opened and closed by means of a closure. A second bulk material component may be filled from the filling box into the block forming elements via the lower outlet.

19 Claims, 9 Drawing Sheets

DOSING APPARATUS

PRIORITY CLAIM

This application claims the benefit of priority from Germany Patent Application No. 10 2018 116 302.9, filed Jul. 5, 2018, the contents of which are incorporated in their entirety herein by reference.

FIELD OF THE INVENTION

The invention relates to a dosing apparatus for dosing bulk material into block forming elements, and for being arranged on a filling car of a filling apparatus of a block-making machine for manufacturing patterned blocks, in particular paving blocks. The filling car may be pushed back and forth over block forming elements in a displacement direction, and a first bulk material component may be filled into the block forming elements with this car. The dosing apparatus comprises at least one filling box that has a lower outlet that may be opened and closed by means of a closure. A second bulk material component may be filled from the filling box into the block forming elements via the lower outlet.

BACKGROUND OF THE INVENTION

Block-making machines for manufacturing multicolored paving blocks, also known as block machines, are known in the industry. In general, for manufacturing, at least two differently colored bulk material components are required. Usually, a core mass that represents the principal share of volume of the paving block is first filled from the filling car into the block forming elements; usually an attachment mass, which represents what will later be the surface of the paving block and optionally has material properties that are optimized for the same, is applied to the core mass and mixed with the facing mass, and a component of a different color is applied to the surface of the mass in the block forming elements, which generates a pattern on the surface of the paving block.

For these products, there is a high demand for blocks with patterns that imitate a natural block grain, for example the appearance of marble. To that end, it is necessary to develop and optimize block-making machines that are able to generate a grain or marbling that is as natural as possible. Furthermore, it is advantageous if such a machine may be used in as many ways as possible and is able to generate different patterns or single-colored paving blocks.

SUMMARY OF THE INVENTION

The invention improves and further develops a block-making machine so that it may be used to generate as varied and/or natural a pattern as possible on blocks so that the block-making machine is as efficient and cost-effective as possible. One way in which this is achieved is by a dosing apparatus according to claim 1.

The filling apparatus denotes the part of the block-making machine that is able to fill bulk material into the block forming elements. Preferably, the facing mass is the first bulk material component. The second bulk material component is preferably the component in a different color. Preferably, a second, separate filling apparatus first fills the core mass into the block forming elements in a separate process step. However, it is also possible that the first bulk material component is the core mass. In this case, it is possible that both bulk material components may be filled into the block forming elements by the same filling apparatus, or also by different filling apparatuses. Due to the partial closure element, which still closes the outlet in partial areas when the closure is open, the second bulk material component does not emerge in a homogeneous stream, but in segments. "In segments" in this context means that the emerging material emerges in a plurality of streams. These streams are preferably arranged beside each other and preferably over the entire width of the outlet. However, the streams may also potentially be arranged one above the other, or in any conceivable geometric arrangement. Thus, with a single outlet, an effect is achieved as if the filling box had a plurality of smaller outlets. In particular, the effect is achieved in such a way that the second bulk material component may be filled into the block forming elements in strip form. Preferably, the block forming elements are arranged next to each other; particularly preferably, they are arranged in a horizontal plane, similar to a matrix. This preferably results in rows of block forming elements arranged next to each other. The rows of the block forming elements are preferably arranged next to each other, offset in the displacement direction, which results in the matrix arrangement described. When the dosing apparatus moves over the block forming elements in the displacement direction, it is preferred that at least one jet, but preferably a plurality of jets, fill the second bulk material component into each block forming element.

This feature proves to be particularly advantageous in combination with a drive unit with which the second bulk material component, which emerges in segments, may be moved back and forth transversely to the displacement direction in relation to the block forming elements. As a result of the temporal progression in the forward movement of the filling car with the dosing apparatus over the block forming elements in the displacement direction, with the emerging second bulk material component simultaneously moving back and forth in the transverse direction, the second bulk material component may be filled into the block forming elements in a wavelike or irregular pattern. The back and forth movement may potentially be carried out according to various adjustable patterns so that, for example, a slow back and forth movement in combination with a relatively fast movement of the dosing apparatus in the displacement direction may generate a wave-like pattern with a long wavelength. Conversely, a fast back and forth movement in combination with a relatively slow motion of the dosing apparatus in the displacement direction may generate a wave-like pattern with a short wavelength. It is also possible that the back and forth movement does not follow a uniform sequence, but that instead, the emerging second bulk material component is moved back and forth as irregularly as possible, so that a pattern that appears as random as possible may be generated in the block forming elements, which results in a marbling or grain of the finished block that appears as natural as possible. The drive unit may potentially have a control unit in which various movement patterns may be stored and implemented in a targeted manner. The same dosing apparatus and the same block-making machine may be used to generate a wide variety of patterns.

According to at least one other embodiment, the outlet is arranged across the entire width of the filling box, transverse to the displacement direction. With this arrangement of the outlet, the second bulk material component may be filled simultaneously into each block forming element in a row. Thus, patterns may be generated simultaneously in all the block forming elements in a row. This considerably simplifies the process of pattern generation in contrast to processes in which pattern generation is carried out individually and consecutively for each block forming element.

The outlet is preferably arranged on the front or rear side wall of the filling box. The outlet is preferably located at the lower end of the side wall. The outlet is preferably designed as an elongated slot that extends over the entire width of the filling box. For a complete emptying of the filling box the bottom of the filling box may potentially have a gradient toward the outlet. The opening of the outlet may potentially be arranged in the plane of the side wall. The opening may likewise be arranged in the plane of the bottom of the filling box. The plane of the opening may also potentially be at an angle to the plane of the side wall and/or an angle to the plane of the bottom, or the opening may be arranged in a curved surface such as a curved side wall or a curved bottom.

According to at least one additional embodiment, the partial closure element is arranged directly in front of the outlet, at least when the closure is open, and the partial closure element has recesses in its extension that covers the outlet, so that the outlet may be closed in partial areas by means of the partial closure element and the second bulk material component may be filled from the filling box into the block forming elements through the recesses.

The partial closure element preferably has a flat basic shape that is implemented complementary to the shape of the outlet. The partial closure element thus may cover the entire surface of the outlet. The recesses are preferably arranged in the flat basic shape of the partial closure element. The recesses may potentially also be arranged as holes of any shape and arrangement on the surface of the partial closure element and the recesses may be arranged at the edge of the surface of the partial closure element. The recesses may be arranged close to the edge, or alternatively directly at the edge, so that the edge exhibits an alternating profile at these points.

The partial closure element is preferably of rectangular design. Preferably, the partial closure element has an alternating, serrated profile at its lower edge. Thus, in the transverse direction, the partial closure element has regions arranged side by side with a larger vertical extent and other regions with a smaller vertical extent, the upper edge of the partial closure element being a straight line in the transverse direction over the entire width, the partial closure element having the alternating profile arranged in front of the outlet when the closure is open, so that at the locations where the partial closure element has a larger vertical extension, the outlet is closed by the partial closure element, and the recesses are arranged at the locations that have a smaller vertical extension.

The alternating profile is preferably a rectangular profile. The rectangular profile is suitable for closing the outlet in partial areas in a particularly simple and effective manner. As a result of the rectangular profile, there are vertical edges of the partial areas, which corresponds to a particularly simple form of subdivision into closed and unclosed partial areas.

According to at least one additional embodiment, the partial closure element is replaceable.

Consequently, the partial closure element is preferably detachably fastened to the dosing apparatus. The partial closure element may potentially be fastened to the filling box directly in front of the outlet, or it may be fastened to the closure itself. Preferably, the partial closure element is capable of being fastened with screws. Due to the detachable fastening, the partial closure element may be quickly and easily replaced with another partial closure element, for example with differently arranged recesses and/or recesses of different size and/or number, so that the second bulk material component will emerge from the dosing apparatus in other parts of the outlet. As a result of the replaceable alternating profile, the pattern generated by the dosing apparatus may be varied quickly and easily.

According to at least one additional embodiment, the dosing apparatus has at least one frame apparatus arranged on at least one side of the filling box to which the filling box may fastened in a suspended manner. The embodiment of the frame apparatus is preferably a structure that encloses the filling box in the manner of a suspension apparatus. Preferably, the frame apparatus may be fastened to the filling car of the filling apparatus of a block-making machine. The filling box is preferably suspended from the frame apparatus. The frame apparatus preferably has cover elements that protect sensitive areas of the dosing apparatus from damage. In particular, by means of cover elements, the frame apparatus protects the opening and closing mechanism of the outlet from damage. The frame apparatus preferably has a recess on its upper side via which the filling box may be filled with bulk material. Furthermore, the frame apparatus preferably has a second recess which is arranged at the outlet of the filling box.

In accordance with at least one additional embodiment, the drive unit allows the filling box to be moved back and forth in at least one direction transverse to the displacement direction relative to the frame apparatus. The filling box is preferably suspended from the frame apparatus so that it may swing back and forth in at least one direction that is transverse to the displacement direction. With the aid of the drive unit, a pendulum movement of the filling box may preferably be induced relative to the frame apparatus. The drive unit may preferably be used to prevent the filling box from engaging in a pendulum movement relative to the frame apparatus, for example by means of a closure element in the drive unit. In this embodiment, the back and forth movement of the emerging second bulk material component may be generated particularly easily in relation to the block forming elements. With the aid of the drive unit, the filling car is preferably moved back and forth, in relation to the frame apparatus, transverse to the displacement direction, when the outlet is open. Thus, the partial areas from which the second bulk material component emerges move in relation to the block forming elements.

According to at least one additional embodiment, the drive unit allows at least the partial closure element to be moved back and forth in relation to the filling box, in at least one direction transverse to the displacement direction. This embodiment achieves the same effect as the embodiment described above. However, in this case, the entire filling box is not moved, only the partial closure element. This causes the partial areas of the partial closure element that partially close the outlet to be moved back and forth transverse to the displacement direction. The unclosed partial areas from which the second bulk material component emerges are thus also displaced in a direction transverse to the displacement direction and thus also in relation to the block forming elements. Potentially, only the partial closure element may be movable, or the partial closure element may be fastened to a retaining element and the retaining element may be moved with the aid of the drive unit. Potentially, the partial closure element may be fastened to the closure and the closure with the drive unit may be movable transverse to the displacement direction. In addition to the opening movement of the closure, the closure is preferably movable in an additional direction by means of the drive unit.

In addition, it is possible that the dosing apparatus may have two drive units that act in the transverse direction, one that moves the filling box relative to the frame apparatus and another that moves the partial closure element relative to the filling box. Thus, two overlapping transverse movements of the second bulk material component may be generated; thus, with this embodiment, additional degrees of freedom may be generated in the adjustability of the pattern.

According to at least one other embodiment, the closure is designed as a slider, wherein the closure may be displaced in at least one displacement direction parallel to the plane of the opening of the outlet and may thus be brought from a position that closes the outlet into an opened position. For a straightforward implementation of the invention, it is particularly advantageous if the closure is designed as a slider that may be moved vertically between open and closed positions. The outlet may thus be closed and opened with the aid of a particularly simple control system. In this case, the closure may potentially close the outlet in a lowered position relative to a vertical direction. The outlet is preferably openable by lifting the closure in a vertical direction.

According to at least one additional embodiment, the partial closure element is implemented as part of the closure, the partial closure element being arranged in the opened position of the closure, immediately in front of the outlet and closing partial areas of the outlet.

Preferably, in this opened position, the closure with the partial closure element closes partial areas of the outlet. The closure with the partial closure element may also potentially be capable of being brought into a third position, in which the outlet is fully open. Preferably, in this third position, the partial closure element is no longer arranged directly in front of the outlet. This placement is, for example, attractive for maintenance purposes or potentially also for a non-intended use of the dosing apparatus, for example for the area-wide application of an additional layer, such as a surface layer or intermediate layer, on the material in the block forming elements or on the bottom of the block forming elements.

In this embodiment, the closure is preferably designed as a rectangular surface element. The partial closure element is preferably arranged in the plane of the flat extension of the surface element. The partial closure element is preferably arranged directly adjacent to the surface element of the closure. In this case, preferably, the surface element completely covers the outlet when closed. When the closure is open, the partial closure element covers the outlet with the aid of the recesses, preferably in partial areas.

In the above-described third position, no area of the closure or of the partial closure element is arranged in front of the outlet; this may be achieved by an additional upward movement of the closure from the opened position, with the partial closure element arranged thereon.

According to at least one additional embodiment, a plurality of partial closure elements are arranged on top of each other in the displacement direction of the closure, with the closure being able to be displaced in the displacement direction into different opened positions, with a partial closure element being arranged in front of the outlet in each of these positions respectively.

This is particularly advantageous because in this embodiment, it is possible to change between a closed position and different opened positions by simply moving the closure that has the partial closure elements arranged on it. Preferably, a respectively different partial closure element is arranged in the various opened positions, or no partial closure element at all is arranged in front of the outlet. As a result, it is particularly easy to change between different patterns without it being necessary to disassemble the partial closure elements. The partial closure elements are preferably detachably fastened to each other and/or to the closure and/or a retaining element. Thus, the partial closure elements are easily replaceable and any number of partial closure elements may be arranged on the dosing apparatus. Preferably, an additional, completely opened position is also possible in this embodiment, in which none of the partial closure elements is arranged in front of the outlet and the outlet is therefore completely open.

According to at least one additional embodiment, the closure is designed as a flap that may be brought from a position that closes the outlet to an opened position by rotation about a rotation axis arranged parallel to at least one of the outer edges of the closure.

Preferably, the rotation axis is arranged parallel to the upper edge of the closure. In this case, the flap is preferably capable of being opened by an upward rotating motion. This has the advantage that the flap in this raised position does not hinder filling the second bulk material component into the block forming elements. However, it is also possible to arrange the rotation axis in such a way that the flap may be opened downwards or sideways. Preferably, in this embodiment, the partial closure element is arranged on the filling box or a retaining element and not on the closure flap. Preferably, however, the partial closure element is detachably fastened in this embodiment as well. Preferably, the partial closure element is replaceable. In this case, it would also be possible to implement the partial closure element as a sieve or perforated plate.

It is further possible that the filling apparatus of the block-making machine further has a scraper element and a roller element, and
  a) the dosing apparatus is arranged between the filling car and the roller element when viewed in the displacement direction, and the roller element is arranged between the dosing apparatus and the scraper element, or
  b) the dosing apparatus is arranged between the roller element and the scraper element when viewed in the displacement direction, and the roller element is arranged between the filling car and the dosing apparatus.

The dosing apparatus according to the invention is particularly advantageous because it may be used independently of the type of block-making machine, the filling apparatus of the block-making machine, or the type of filling car used. The dosing apparatus according to the invention may be used with almost all block-making machines. In particular, it is also possible to retrofit a block-making machine with the dosing apparatus according to the invention. This is possible principally because the dosing apparatus has a high degree of variability in terms of its precise positioning in the filling apparatus of the block-making machine. Depending on the technical requirements or desired result, the dosing apparatus may be arranged either directly on the filling car of the filling apparatus of the block-making machine, or between the roller element and the scraper element. Many other positions of the dosing apparatus in the filling apparatus of the block-making machine are also possible. It is even possible for it to be arranged inside the filling car of the filling apparatus of the block-making machine.

The invention further includes a method for producing patterned blocks, in particular paving blocks, by means of a filling apparatus of a block-making machine comprising block forming elements, a filling car by means of which a first bulk material component may be filled into the block forming elements, and which may be pushed back and forth over the block forming elements in a displacement direction, and a dosing apparatus arranged on the filling car, the dosing apparatus comprising at least one drive unit and a filling box, the filling box having a lower outlet that may be opened and closed with the aid of a closure, the outlet in the open state also being closable in partial areas in a direction transverse to the displacement direction with the aid of a partial closure element, so that the second bulk material component may be filled in segments into the block forming elements, comprising the steps:

Filling the first bulk material component from the filling car into the block forming elements by moving the filling car over the block forming elements in or opposite a displacement direction;

Opening the closure of the outlet of the dosing apparatus and filling the second bulk material component by moving the dosing apparatus over the block forming elements in or against the displacement direction, with simultaneous back-and-forth movement of the emerging second bulk material component relative to the block forming elements with the aid of the drive unit, in a transverse direction transverse to the displacement direction.

Preferably, before the start of the above method, the filling box of the dosing apparatus and the filling car are preferably loaded from above with bulk material components by means of at least one silo. The silo is preferably placed behind the block forming elements so that after the filling process, the filling car with the dosing apparatus may be moved over the block forming elements in the displacement direction in the forward stroke, and preferably the first bulk material component may be filled into the block forming elements. Filling with the second bulk material component may, however, also be carried out by means of another silo or another filling apparatus, which may be arranged as needed. Preferably, the forward stroke is followed by a backward stroke, i.e. a movement of the filling car opposite the displacement direction. Preferably, during the return stroke, the second bulk material component is able to be filled into the block forming elements. However, it is also possible that the silo is arranged on the other side of the block forming elements, so that the first bulk material component may be filled in a return stroke and then the second bulk material component may be filled in a forward stroke. Furthermore, it is possible to first fill the second bulk material component into the block forming elements with the aid of the dosing apparatus in a forward or backward stroke, and then to fill the first bulk material component during a movement in the opposite direction. The variability in the process sequence is particularly advantageous, because the arrangement of the individual components of the block-making machine may be adapted to local conditions and, in addition, the greatest possible variability in the course of the production process may be achieved, which increases the machine's possible applications.

It is also possible that after the process steps described above, additional steps are carried out for manufacturing the blocks. Possible steps include for example pretreating the block forming elements, for example with anti-stick agents, applying additional bulk material components (this may also take place between or during the steps described above), steps for smoothing the bulk material surface in the block forming elements, vibrating steps for compacting the bulk material, steps for curing or drying the bulk material, and post-treatment of the surface, such as grinding, impregnating or hardening.

Additional advantages, aims and characteristics of the invention are explained by the following description of the attached drawings. Similar components may have the same reference signs in different embodiments.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

Figure 1:
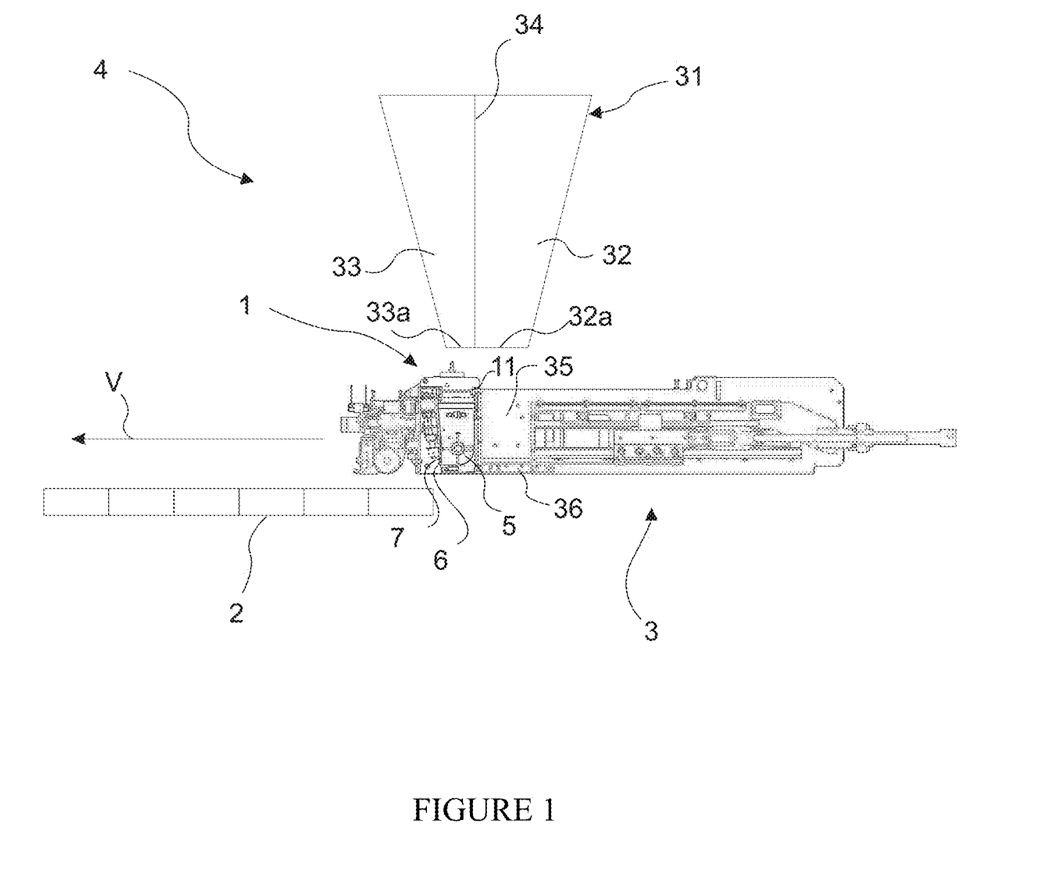
FIG. 1 is a side view showing the basic arrangement of the individual components of a filling apparatus of a block-making machine 4 in one embodiment.

FIG. 1 shows a side view of the basic arrangement of the individual components of a filling apparatus of a block-making machine 4 in one embodiment. The dosing apparatus 1 is arranged at the front of the filling car 3 in the displacement direction V. The dosing apparatus 1 and the filling car 3 each respectively have a filling box 5, 35, that may be filled from above with bulk material with the aid of the silo 31. The silo 31 preferably has a partition wall 34 that partitions the interior of the silo 31 into a first and second chamber 32, 33, in which different bulk material components may be stored separately from each other and from there may be filled into the filling boxes 5, 35 separately via respective outlets 32a, 33a. However, it is likewise possible that only the first bulk material component may be filled into the filling car 3 by means of the silo. In this case, the dosing apparatus 1 may preferably be filled with the second bulk material component 8 using a separate silo. This second silo may be arranged anywhere. This takes account of the fact that, due to the low throughput of the second bulk material component 8, the dosing apparatus 1 does not necessarily have to be filled as frequently with the first bulk material component as does the filling car 3. The filling car 3 and dosing apparatus 1 may be moved together in or opposite the displacement direction V by means of block forming elements 2. In this case, bulk material components may be filled into the block forming elements through outlets 6, 36 in the filling boxes 5, 35. The filling box 5 of the dosing apparatus 1 has a closure 7 for closing the outlet 6. Preferably, the outlet 36 of the filling box 35 also has a closure.

Figure 2:
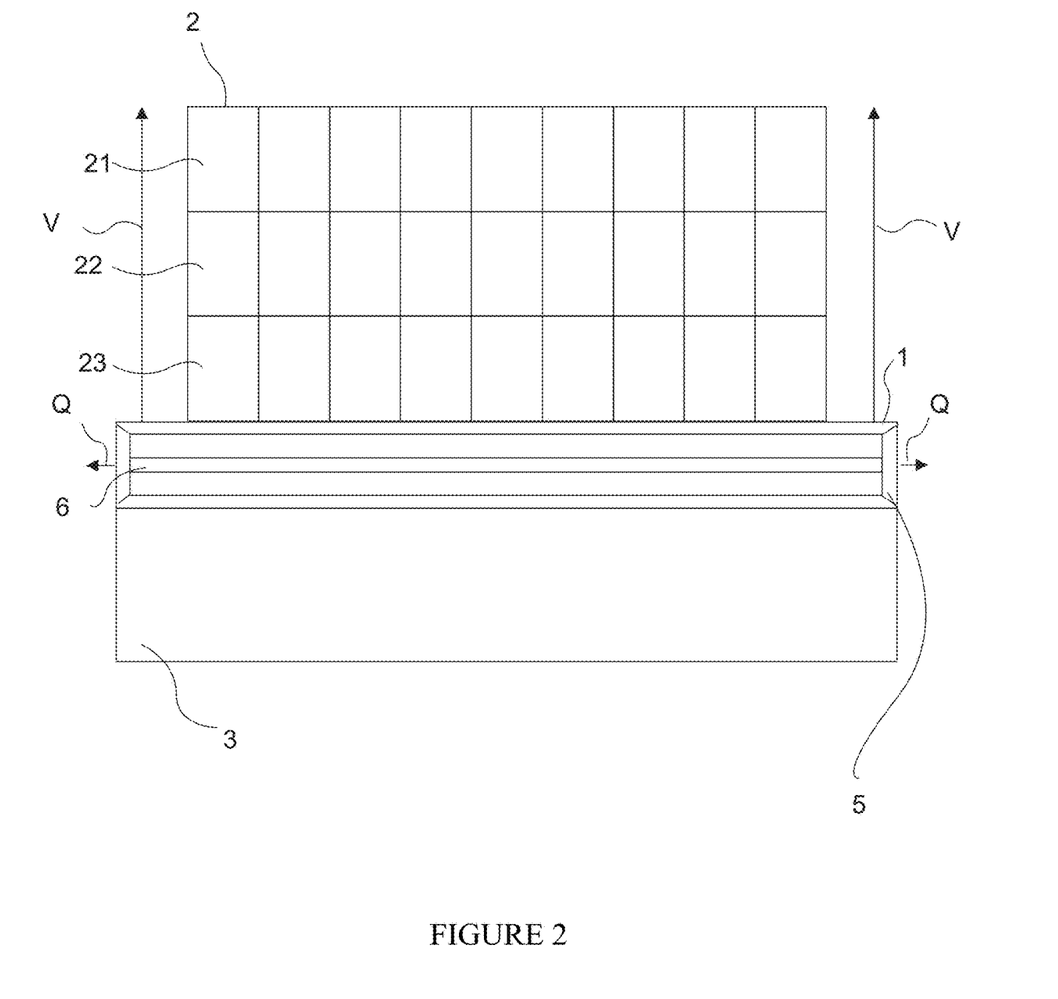
FIG. 2 is a schematic sketch of a top view of the dosing apparatus 1.

FIG. 2 shows a schematic sketch of a top view of the dosing apparatus 1; The filling box 5 of the dosing apparatus 1 and the filling car 4 are arranged above the block forming elements 2 and may be moved in and opposite the displacement direction V. The block forming elements 2 are arranged in a matrix that consists of a plurality of rows 21, 22, 23, which are arranged next to each other, offset in the displacement direction V. In each block forming element 2, one block may be formed. The filling box 5 of the dosing apparatus 1 may be moved back and forth in transverse direction Q, which is arranged perpendicular to the displacement direction V and horizontally.

Figure 3:
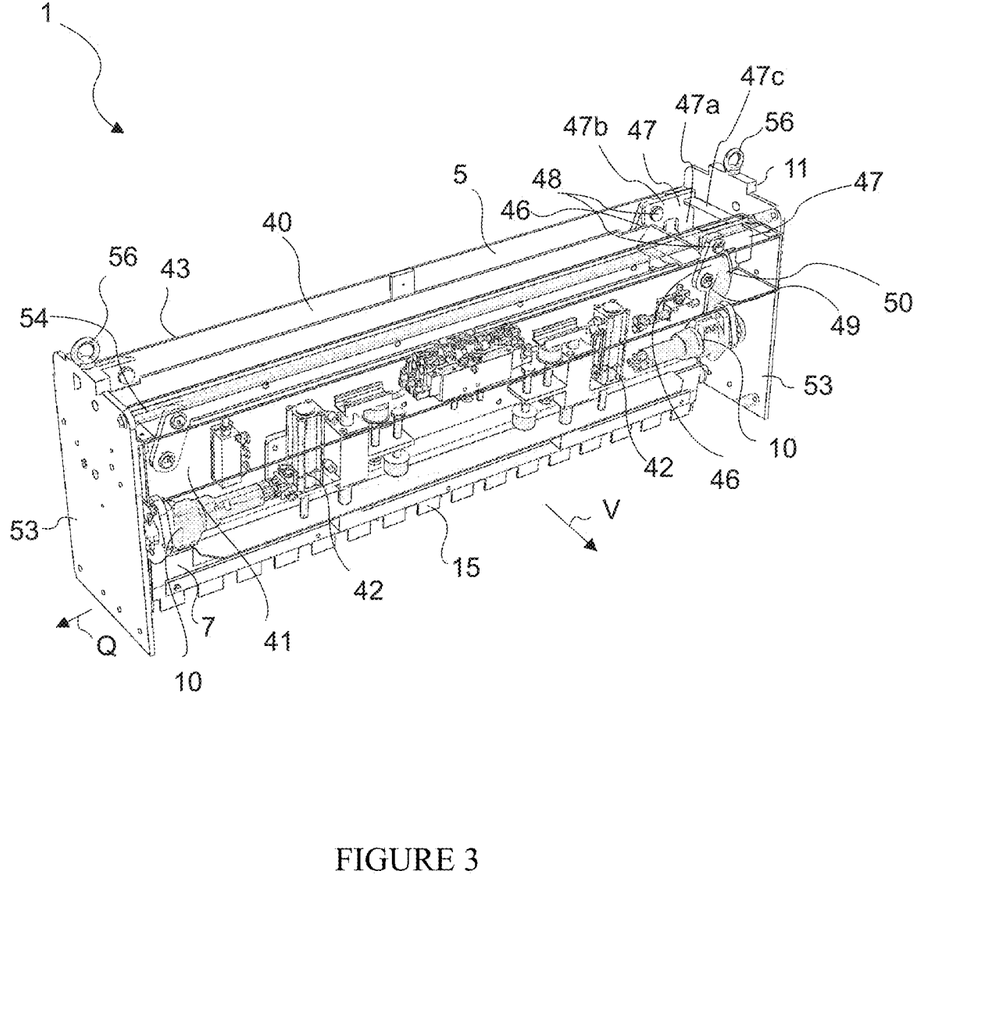
FIG. 3 is a perspective view of a representation of the dosing apparatus 1.
Figure 4:
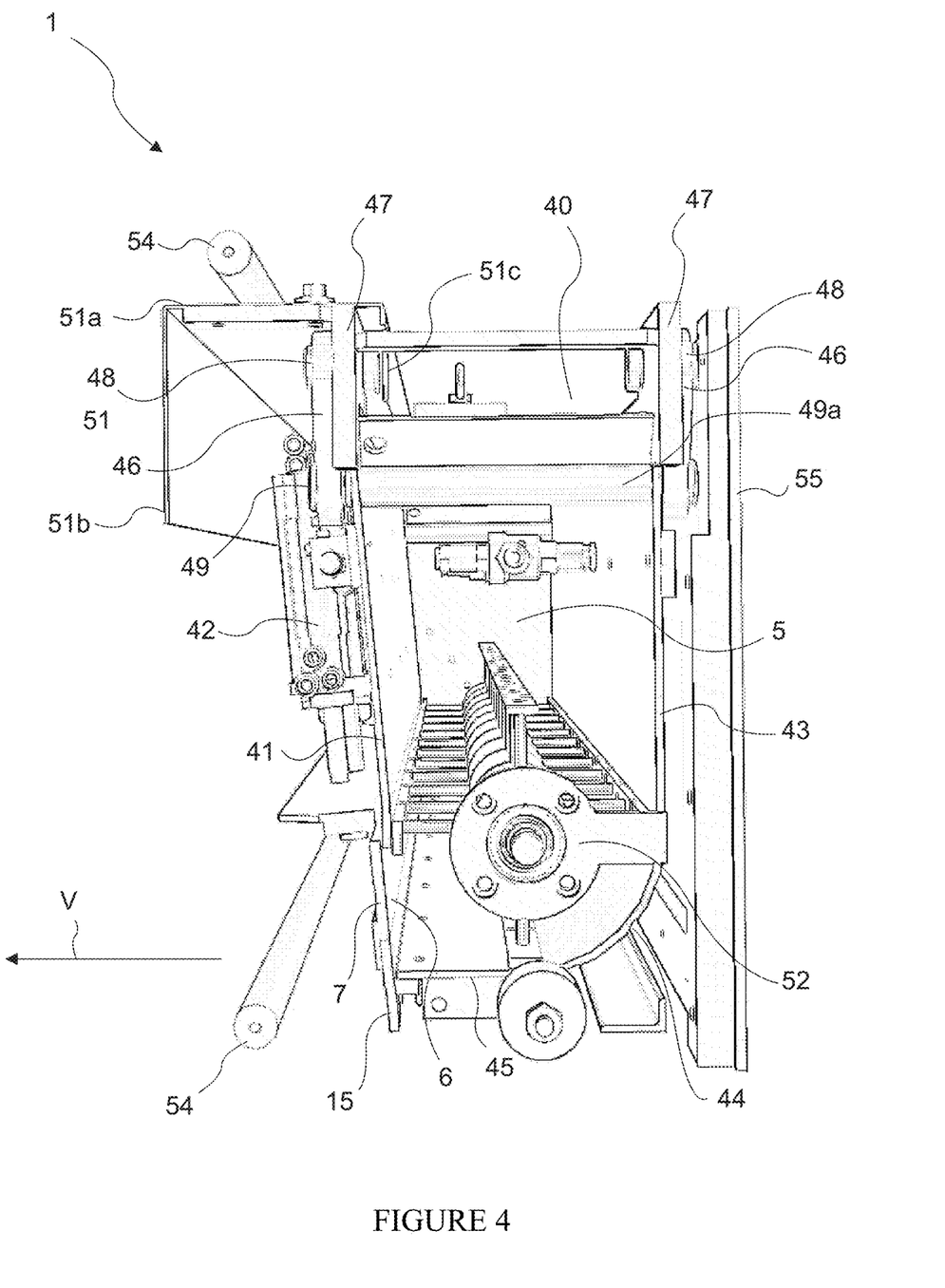
FIG. 4 is a representation of the dosing apparatus 1 along a section in a displacement direction V.

FIGS. 3 and 4 show the dosing apparatus 1 in perspective view (FIG. 3) and along a section in the displacement direction V (FIG. 4). The filling box 5 has a filling opening 40 on its upper side. The outlet 6 is arranged at the lower end of the front 41 of the filling box 5, which points in the displacement direction V. The closure 7 is designed as a slider that may be opened and closed by means of a drive 42. The back 43 of the filling box 5 is preferably designed to be removable. Preferably, the back side 43 merges into the bottom 45 of the filling box with a rounding 44. To better empty the filling box 5, the bottom 45 may be inclined toward the outlet 6. For this purpose, a stirring element 52 may also be arranged inside the filling box 5, and may be rotated with a chain drive 52a. The stirring element 52 may preferably be designed as a stirring shaft or as a dosing shaft. It is likewise possible to use a vibrating element instead of the stirring element 52, and by means of this element, bulk material residues may be moved out of the filling box 5 through the generation of vibrations. The quantity of the second bulk material component 8 fed to outlet 6 is preferably adjustable. The feed quantity is preferably controlled by means of the stirring element 52. Preferably, the speed of the stirring element 52 is adjustable. The filling box 5 is suspended from the frame apparatus 11 at the box's upper corners, with at least one lever 46 respectively. The lever 46 is rotatably fastened at one end 48 to a preferably L-shaped support element 47 of the frame apparatus 11. The support element preferably has a first, vertical leg 47a, which is attached to the side element 53, and a second, horizontal leg, to which the lever 46 is rotatably fastened by means of its first end 48. At its other end 49, the lever 46 is rotatably fastened to the filling box 5. The levers 46 of two respective upper corners of the filling box 5, located one behind the other in the displacement direction, are preferably connected by a shared rotation axis 49a arranged parallel to the displacement direction V. Preferably, the support elements 47 of two upper corners of the filling box 5, being located behind each other in the displacement direction, are respectively connected by a connecting element 47c, arranged parallel to the displacement direction V. The side elements 53 are connected to each other via rods 54 and a rear wall 55, in such a way as to enclose the filling box 5. The filling box 5 may be moved back and forth in relation to the frame apparatus 11 in the transverse direction Q by means of the drive unit 10 and the rotatable fastening of the levers 46. Preferably, the drive unit 10 is arranged on the front 41 of the filling box 5. The drive unit is preferably designed as a pneumatic bellows cylinder 10, 50. The filling box 5 hitting the side elements 53 may be prevented by means of adjustable end stops. To protect all the drive elements 10, 42, the frame apparatus 11 has a cover 51 on its front side, which is a U-profile with a base side 51a, a longer left leg 51b and a shorter right leg 51c. To transport the dosing apparatus 1, the frame apparatus 11 has fastening eyelets 56.

Figure 5A:
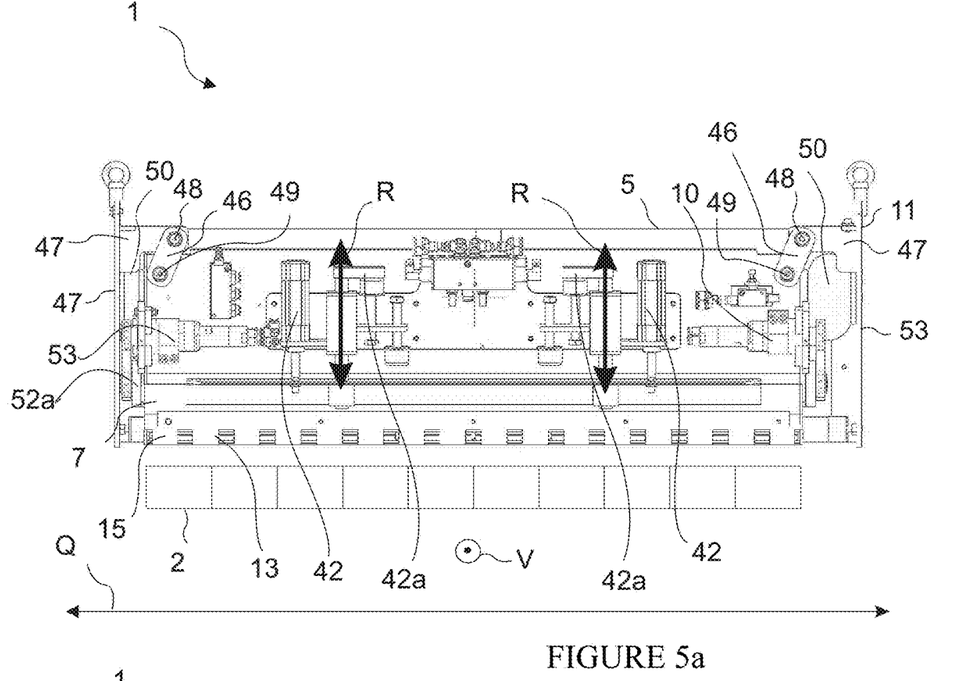
FIG. 5a is a front view of the dosing apparatus 1 with the outlet 6 closed.
Figure 5B:
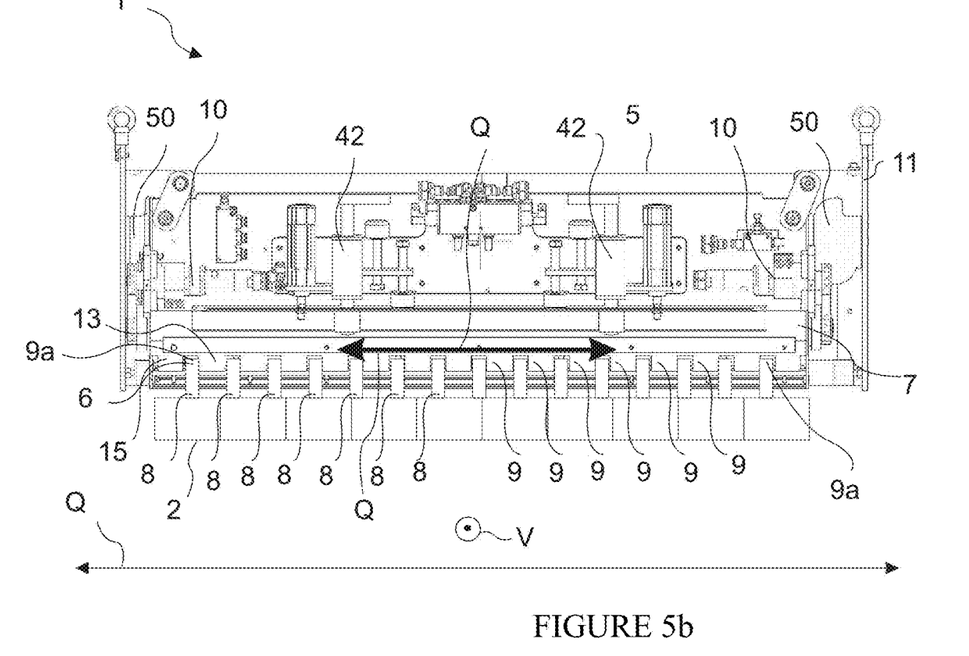
FIG. 5b is a front view of the dosing apparatus 1 with the outlet 6 opened.

FIGS. 5a and 5b show a front view of the dosing apparatus 1. FIG. 5a shows the dosing apparatus 1 with a closed outlet 6. FIG. 5b shows the dosing apparatus 1 with an open outlet 6. When in a closed state, the closure 7 completely closes outlet 6. The closure 7 and partial closure element 15 arranged thereon may be moved in the vertical direction R with the drive 42. The drive 42 is preferably designed as two pneumatic cylinders that work in parallel. The outlet 6 may be opened by moving the shutter 7 upward in the vertical direction R. Preferably, both the open and the closed positions of the slider may be precisely adjusted by end stops 42a. In the open state, the partial closure element 15 is arranged with the alternating profile 13 in front of the outlet 6 and closes partial areas thereof 9. Through the partial areas that the alternating profile 13 does not close, i.e. the recesses 9a (marked twice for clarity) of the partial closure element 15, the second bulk material component 8 emerges in segments from the outlet 6 and may be filled into the block forming elements 2. At the same time, the filling box 5 with the drive unit 10 may be moved in the transverse direction Q, so that the recesses 9a of the outlet 6, and thus also the second bulk material component 8 that emerges from them, are movable relative to the block forming elements 2.

Figure 6:
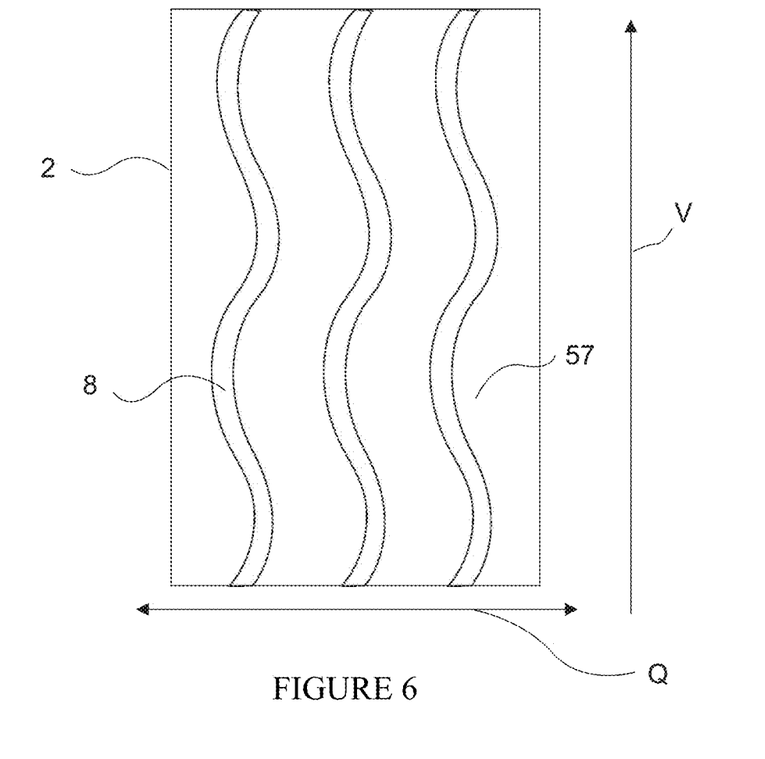
FIG. 6 is a schematic representation of a top view of a completely filled block forming element 2.

FIG. 6 shows a schematic top view of a completely filled block forming element 2. The block forming element 2 is almost completely filled with the first bulk material component 57. On the surface of the first bulk material component 57, the second bulk material component 8, which has a different color than the first bulk material component 57, is applied wave-like strips with the aid of the dosing apparatus, the outlet 6 of which is closed in segments, and simultaneous linear movement thereof in the displacement direction V and simultaneous back and forth movement in the transverse direction Q. The strips shown here are arranged parallel to the displacement direction V.

Figure 7:
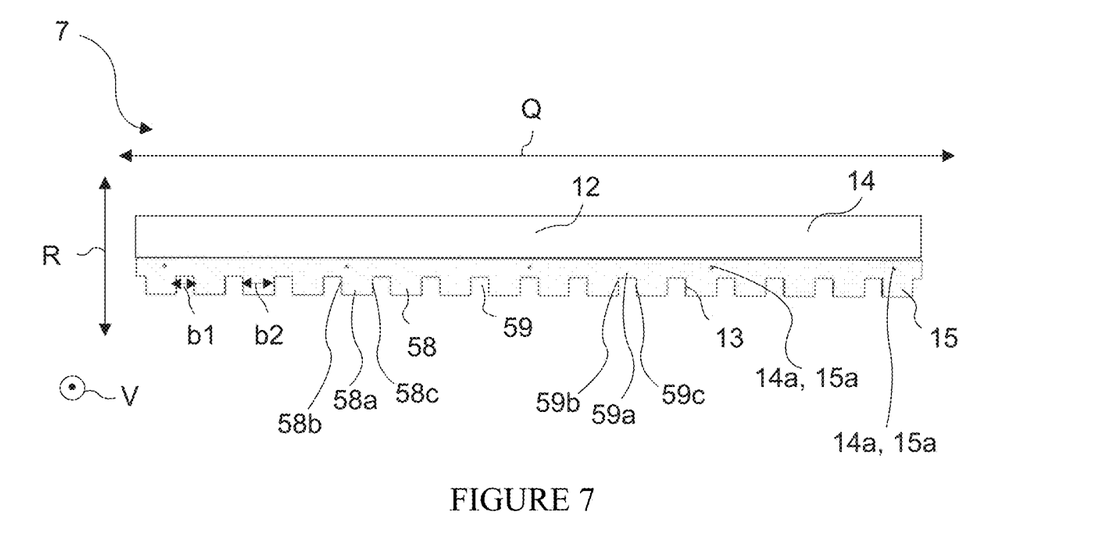
FIG. 7 is a detailed drawing of the closure 7 according to one embodiment.

FIG. 7 shows a detailed drawing of the closure 7 with a partial closure element 15 arranged thereon. The closure comprises a flat part 14 and is designed as a surface element 12. The partial closure element 15 is designed with an alternating profile 13, which comprises teeth 58 and recesses 59 that are arranged next to each other, alternating, in a transverse direction Q. The teeth 58 and recesses 59 are rectangular and preferably have a horizontal base 58a, 59a and a vertical left edge 58b, 59b and vertical right edge 58c, 59c. The recesses 59 have a width $b_1$. The teeth 58 have a width $b_2$. The teeth 58 are arranged in the open state in front of outlet 6 and partially close it. When the recesses 59 are in the open state, the second bulk material component 8 exits the outlet 6 through them. The width $b_1$ of the recesses 59 directly influences the width of the wave-like strips in which the second bulk material component 8 is filled into the block forming elements 2 (see FIG. 6). The width $b_2$ of the teeth 58 directly influences the distance between the wave-like strips. The partial closure element 15 is detachably fastened to the flat part 14 of the closure 7. Preferably, the partial closure element 15 and flat part 14 have holes 14a and 15a, and the two parts may be fastened to each other using screws in these holes. The partial closure element 15 may be replaced by another partial closure element.

Figure 8A:
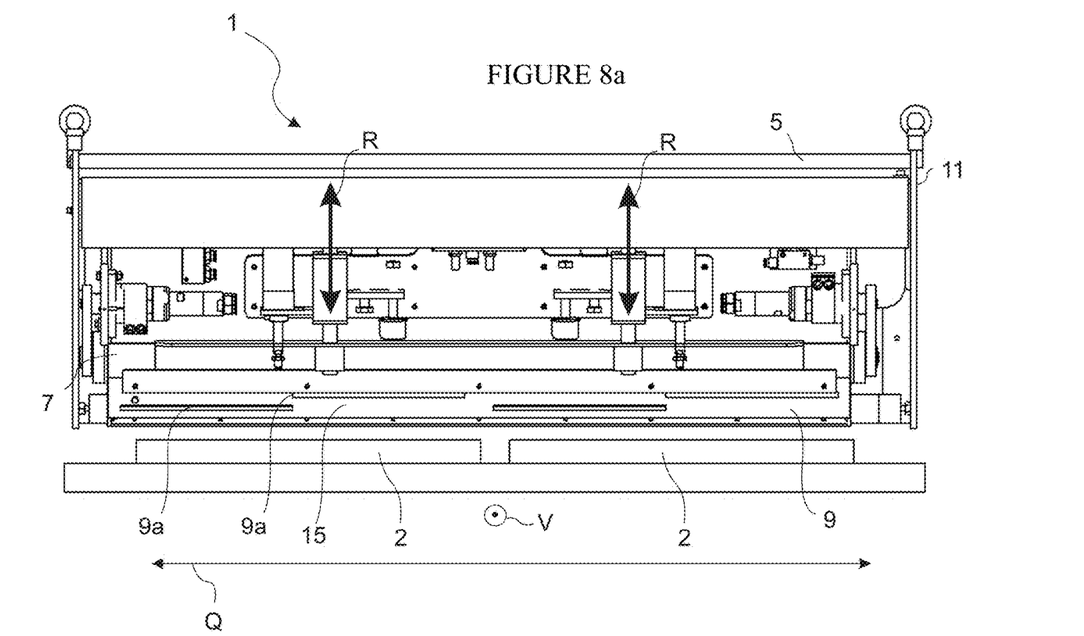
FIG. 8a is a front view of the dosing apparatus 1 with another partial closure element 15.
Figure 8B:
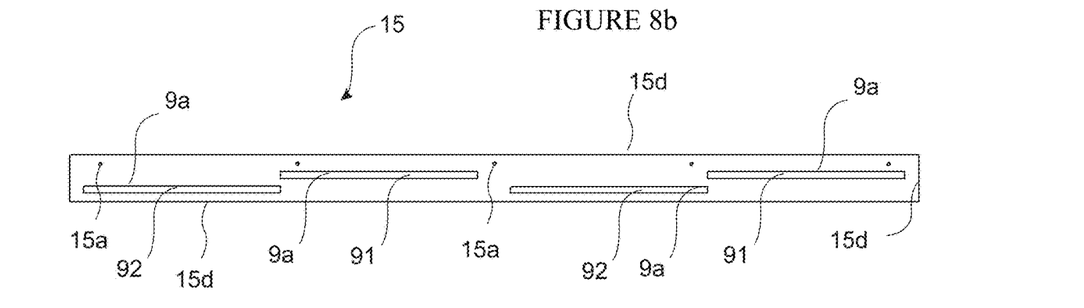
FIG. 8b is a detailed drawing of the other partial closure element 15.

FIG. 8a shows the dosing apparatus 1 with another partial closure element 15. The partial closure element 15 shown is enlarged in FIG. 8b. This partial closure element 15 is suitable for the use of different opened positions of the closure 7. The recesses 9a are of a rectangular design. The recesses are arranged next to each other in the horizontal direction and slightly offset in the vertical direction. The rectangular shape has a greater extent in the horizontal direction than in the vertical direction. All recesses are arranged in the surface of the partial closure element 15 with at least a small distance to the edge 15d of the partial closure element 15. For fastening, the partial closure element 15 has holes 15a. The partial closure element 15 has upper recesses 91 and lower recesses 92, which may be respectively arranged in front of the outlet 6 through different opened positions of the closure 7.

Figure 8C:
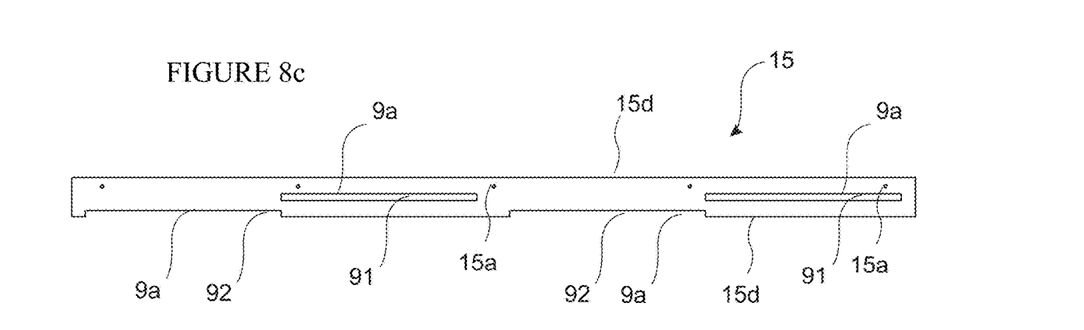
FIG. 8c is a detailed drawing of another partial closure element 15.

FIG. 8c shows an additional embodiment of the partial closure element 15. In this embodiment, recesses 9a are arranged in the surface as directly adjoining the lower edge 15d, as well as in the surface of the partial closure element 15. This partial closure element 15 also has holes 15a for fastening.

Figure 9:
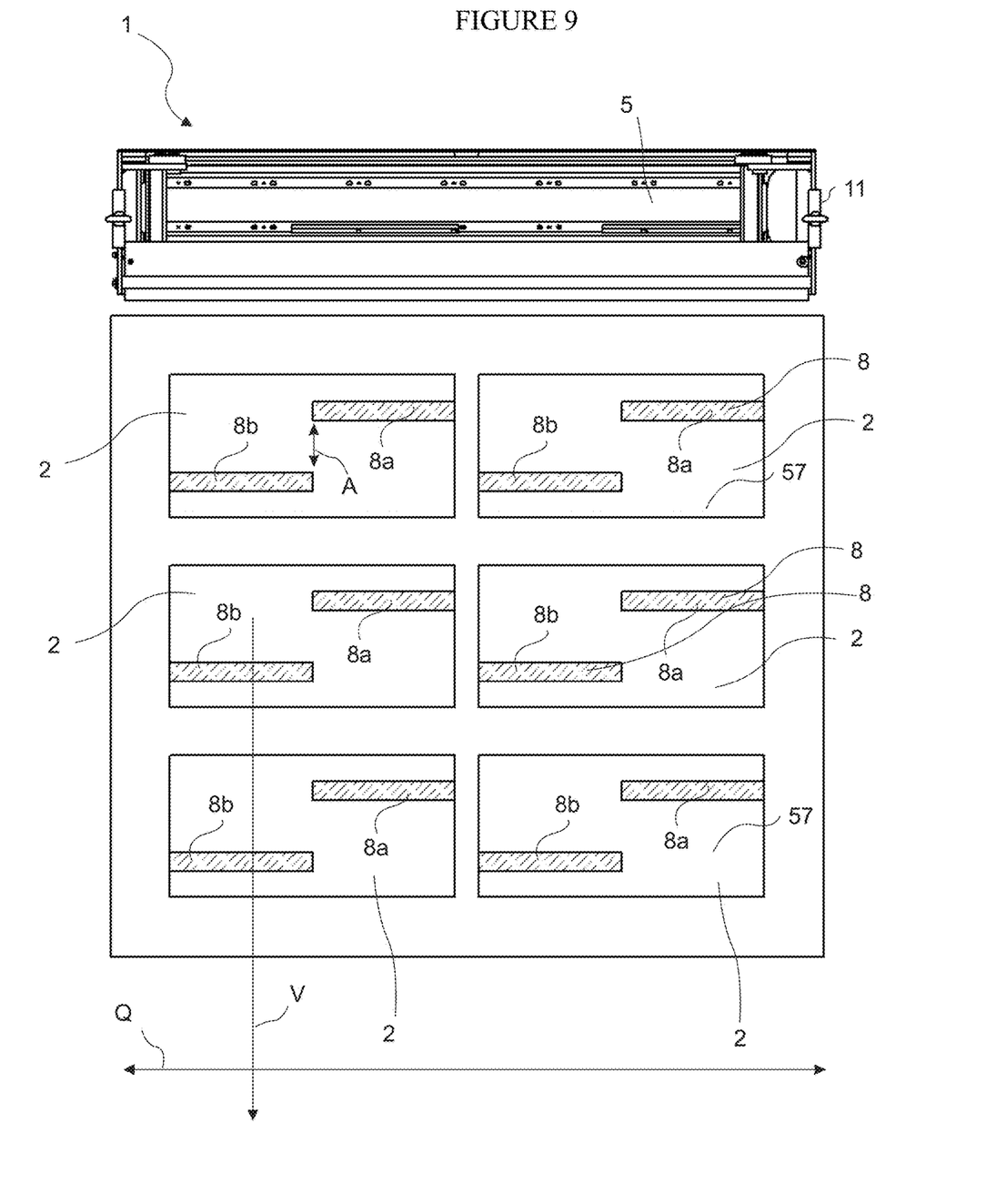
FIG. 9 is a schematic top view of the dosing apparatus 1 and the block forming elements 2.

FIG. 9 shows a top view of the dosing apparatus 1 with completely filled block forming elements 2. When the block forming elements 2 are being filled with the second bulk material component 8, a partial closure element 15 is used, similar to the partial closure element 15 shown in FIG. 8b. Thus, the second bulk material component 8 may be filled into the block forming elements 2 in strips that are aligned transversely to the displacement direction V. In a first opened position of the closure 7, initially only the upper recesses 91 (see FIG. 8b) are arranged in front of the outlet 6 and generate the first strips 8a of the second bulk material component. The second strips 8b may be generated by arranging the lower recesses 92 (see FIG. 8b) in front of the outlet 6 in a second opened position of the closure 7. Depending on the speed of the position change between the two opened positions and/or the speed of the dosing apparatus 1 in or against the displacement direction V, any distance A between the first and second strips 8a, 8b may be generated in the block forming elements 2.

Figure 10A:
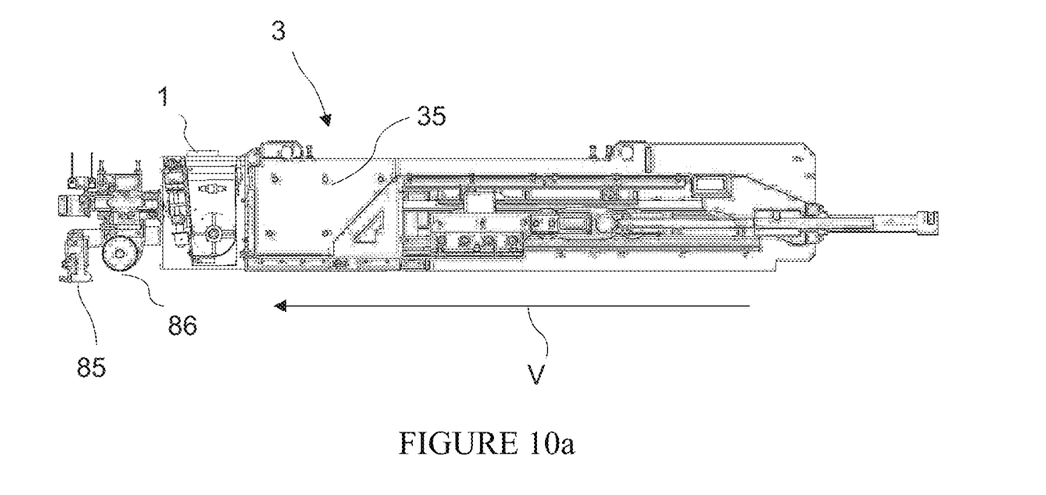
FIG. 10a is one possible arrangement of the dosing apparatus 1 on the filling car 3.
Figure 10B:
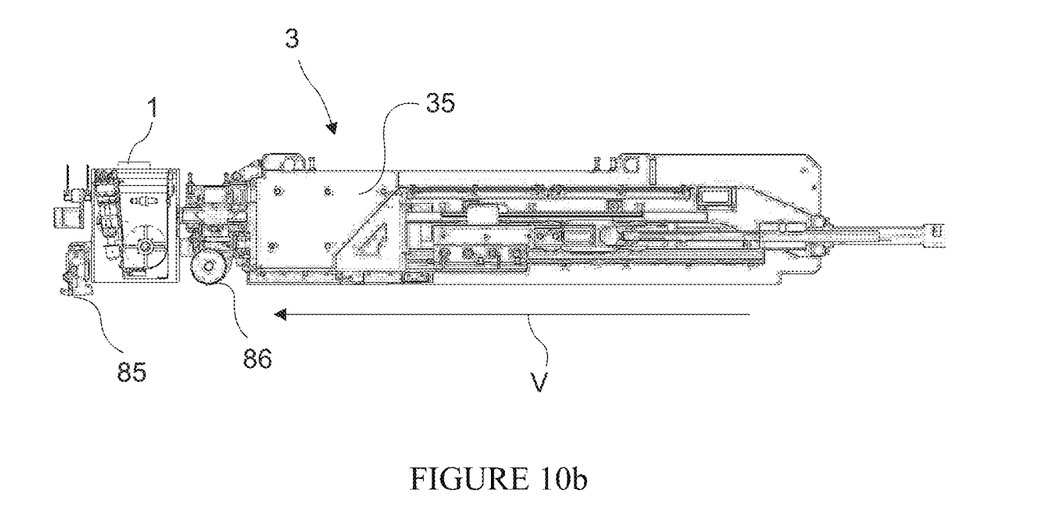
FIG. 10b is another possible arrangement of the dosing apparatus 1 on the filling car 3.

FIGS. 10a and 10b show various possibilities for arranging the dosing apparatus 1 on a filling car 3. FIG. 8a shows an embodiment in which the dosing apparatus 1 is arranged directly on the filling box 35 of the filling car 3. In the displacement direction V, a roller element 86 and a liftable and lowerable scraper element 85 are arranged directly next to the dosing apparatus 1. With this positioning, it is likewise possible to arrange the dosing apparatus 1 in the filling box 35 of the filling car 3, which however goes hand in hand with a reduced filling box volume of the filling car 3. In the arrangement sequence described, the second bulk material component 8, which is filled in strip form, is preferably leveled into the block forming elements 2 with the aid of the roller element 86; as a result, a more blurred strip pattern may be generated. FIG. 8b shows an alternative arrangement in which the roller element is arranged between the dosing apparatus 1 and the filling car 3 and the scraper element 85 is arranged on the other side of the dosing apparatus 1. When the second bulk material component 8 is being filled in the return stroke of the filling car 3 and dosing apparatus 1, and the scraper element 85 is raised, no further tool is arranged in the overrun, so as not to blur the strips of the second bulk material component. Preferably, smoothing of the surface takes place in a subsequent shaking process.

One embodiment of the invention may be characterized in that the outlet (6) in its open state may still be closed in partial areas (9) in a direction (Q) transverse to the displacement direction (V) with the aid of a partial closure element (15), so that the second bulk material component may be filled into the block forming elements in segments, and the second bulk material component that emerges in segments may be moved back and forth in a transverse direction transverse to the displacement direction and relative to the block forming elements with the aid of a drive unit arranged on the dosing apparatus.

The applicant reserves the right to claim that all features disclosed in the application documents are essential to the invention, provided that they are new over the prior art, either individually or in combination. It is further noted that characteristics were also described in the individual drawings, which may be advantageous in themselves. The skilled person will immediately recognize that a certain characteristic described in a drawing may be advantageous even without adopting other characteristics from this drawing. Furthermore, the skilled person recognizes that advantages may also arise from combining a plurality of features depicted in individual or different drawings.

LIST OF REFERENCES

1 Dosing apparatus
2 Block forming elements
3 Filling car
4 Filling apparatus of the block-making machine
5 Filling box of the dosing apparatus
6 Outlet of dosing apparatus
7 Closure
8 Second bulk material component
8a First strips
8b Second strip
9 Closed partial areas
9a Recesses
10 Drive unit
11 Frame apparatus
12 Surface element of the closure
13 Alternating profile of the closure
14 Flat part of the closure
14a Bore
15 Partial closure element
15a Bore
15b Additional partial closure element
15c Another partial closure element
15d Edge
21 A first row of block forming elements
22 A second row of block forming elements
23 A third row of block forming elements
31 Silo
32 First chamber
32a Outlet
33 Second chamber
33a Outlet
34 Partition wall
35 Filling box of the filling car
36 Outlet of the filling car
40 Filling opening
41 Front
42 Drive
42a End stop
43 Rear
44 Rounding
45 Ground
46 Lever
47 Support element 48 End
49 Other end
49a Rotation axis
50 Bellows cylinder
51 Cover plate
51a Bottom
51b Left leg
51c Right leg
52 Stirring element
53 Side element
54 Rod
55 Rear wall
56 Fastening eyelets
57 First bulk material component
58 Teeth
58a Bottom
58b Left edge
58c Right edge
59 Recesses
59a Bottom
59b Left edge
59c Right edge
85 Scraper element
86 Roller element
91 Upper recesses
92 Lower recesses
A Distance
V Displacement direction
Q Transverse direction
R Direction of closure movement
b1 Width of recesses
b2 Width of teeth While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. Dosing apparatus for dosing bulk material into block forming elements and for arranging on a filling car of a filling apparatus of a block-making machine for producing patterned blocks, wherein the filling car is pushed back and forth in a displacement direction (V) via block forming elements and a first bulk material component is filled into the block forming elements with the latter, the dosing apparatus comprising: at least one filling box, wherein the filling box has a lower outlet that is opened and closed by means of a closure, wherein a second bulk material component is filled from the filling box into the block forming elements through the lower outlet, characterized in that the outlet in its open state is still closed in partial areas in a direction (Q) transverse to the displacement direction (V) with the aid of a partial closure element, wherein the partial closure element is designed as part of the closure and the partial closure element is replaceable, so that the second bulk material component is filled into the block forming elements in segments, and the second bulk material component that emerges in segments is moved back and forth in a transverse direction (Q) transverse to the displacement direction (V) and relative to the block forming elements with the aid of a drive unit arranged on the dosing apparatus, whereby the dosing apparatus has at least one frame apparatus arranged on at least one side of the filling box to which the filling box is fastened in a suspended manner at the filling box's upper corners with at least one lever respectively, wherein the lever is rotatably fastened at one end to a support element of the frame apparatus and at its other end, the lever is rotatably fastened to the filling box, and with the aid of the drive unit, a pendulum movement of the filling box is induced relative to the frame apparatus.

2. Dosing apparatus according to claim 1, characterized in that the outlet is arranged transverse to the displacement direction (V), over the entire width of the filling box.

3. Dosing apparatus according to claim 1, characterized in that at least when the closure is in an open state, the partial closure element is arranged directly in front of the outlet and the partial closure element has recesses in its extension that covers the outlet, so that the outlet is closed by means of the partial closure element in partial areas, and the second bulk material component is filled from the filling box into the block forming elements through the recesses.

4. Dosing apparatus according to claim 1, characterized in that the filling box is moved back and forth relative to the frame apparatus in at least one direction (Q) transverse to the displacement direction (V), by means of the drive unit.

5. Dosing apparatus according to claim 1, characterized in that at least the partial closure element is moved back and forth relative to the filling box in at least one direction (Q) transverse to the displacement direction (V), by means of the drive unit.

6. Dosing apparatus according to claim 1, characterized in that the closure is designed as a slider, wherein the closure is displaced at least in one displacement direction parallel to the plane of the opening of the outlet and is thus brought from a position that closes the outlet into an opened position.

7. Dosing apparatus according to claim 1, characterized in that the partial closure element is arranged directly in front of the outlet in the opened position of the closure, and closes the outlet in partial areas.

8. Dosing apparatus according to claim 1, characterized in that a plurality of partial closure elements are arranged on top of one another in the displacement direction of the closure, wherein the closure is displaced in the displacement direction into different opened positions, in each of which respectively, a partial closure element is arranged in front of the outlet.

9. Dosing apparatus according to claim 1, characterized in that the closure is designed as a flap that is brought from a position that closes the outlet into an opened position by rotation about a rotation axis arranged parallel to at least one of the outer edges of the closure.

10. Dosing apparatus for dosing bulk material into block forming elements and for arranging on a filling car of a filling apparatus of a block-making machine for producing patterned blocks, wherein the filling car is pushed back and forth in a displacement direction (V) via block forming elements and a first bulk material component is filled into the block forming elements with the latter, the dosing apparatus comprising: at least one filling box, wherein the filling box has a lower outlet that is opened and closed by means of a closure, wherein a second bulk material component is filled from the filling box into the block forming elements through the lower outlet, characterized in that the outlet in its open state is still closed in partial areas in a direction (Q) transverse to the displacement direction (V) with the aid of a partial closure element, so that the second bulk material component is filled into the block forming elements in segments, and the second bulk material component that emerges in segments is moved back and forth in a transverse direction (Q) transverse to the displacement direction (V) and relative to the block forming elements with the aid of a drive unit arranged on the dosing apparatus, whereby the dosing apparatus has at least one frame apparatus arranged on at least one side of the filling box to which the filling box is fastened in a suspended manner at the filling box's upper corners with at least one lever respectively, wherein the lever is rotatably fastened at one end to a support element of the frame apparatus and at its other end, the lever is rotatably fastened to the filling box, and with the aid of the drive unit, a pendulum movement of the filling box is induced relative to the frame apparatus.

11. Dosing apparatus according to claim 10, characterized in that the outlet is arranged transverse to the displacement direction (V), over the entire width of the filling box.

12. Dosing apparatus according to claim 10, characterized in that at least when the closure is in an open state, the partial closure element is arranged directly in front of the outlet and the partial closure element has recesses in its extension that covers the outlet, so that the outlet is closed by means of the partial closure element in partial areas, and the second bulk material component is filled from the filling box into the block forming elements through the recesses.

13. Dosing apparatus according to claim 10, characterized in that the partial closure element is replaceable.

14. Dosing apparatus according to claim 10, characterized in that the filling box is moved back and forth relative to the frame apparatus in at least one direction (Q) transverse to the displacement direction (V), by means of the drive unit.

15. Dosing apparatus according to claim 10, characterized in that at least the partial closure element is moved back and forth relative to the filling box in at least one direction (Q) transverse to the displacement direction (V), by means of the drive unit.

16. Dosing apparatus according to claim 10, characterized in that the closure is designed as a slider, wherein the closure is displaced at least in one displacement direction parallel to the plane of the opening of the outlet and is thus brought from a position that closes the outlet into an opened position.

17. Dosing apparatus according to claim 10, characterized in that the partial closure element is designed as part of the closure, wherein the partial closure element is arranged directly in front of the outlet in the opened position of the closure, and closes the outlet in partial areas.

18. Dosing apparatus according to claim 10, characterized in that a plurality of partial closure elements are arranged on top of one another in the displacement direction of the closure, wherein the closure is displaced in the displacement direction into different opened positions, in each of which respectively, a partial closure element is arranged in front of the outlet.

19. Dosing apparatus according to claim 10, characterized in that the closure is designed as a flap that is brought from a position that closes the outlet into an opened position by rotation about a rotation axis arranged parallel to at least one of the outer edges of the closure.

* * * * *